United States Patent [19]

Wessely

[11] 4,024,989

[45] May 24, 1977

[54] DISPENSING ATTACHMENT FOR INDICATING AMOUNT OF FLUID CONTENT REMOVED FROM A CONTAINER THEREFOR

[76] Inventor: Frank L. Wessely, 360 W. 45th St., New York, N.Y. 10036

[22] Filed: Sept. 2, 1975

[21] Appl. No.: 609,716

[52] U.S. Cl. .................................. 222/154; 222/567
[51] Int. Cl.² ............................................ B67D 1/08
[58] Field of Search .......... 222/541, 563, 566, 567, 222/188, 23, 29, 154; 215/278; 73/290, 428

[56] References Cited

UNITED STATES PATENTS

| | | | |
|---|---|---|---|
| 645,352 | 3/1900 | Devlin | 215/278 |
| 713,693 | 11/1902 | Schroeder | 215/278 |
| 1,438,668 | 12/1922 | Smith | 222/567 X |
| 2,149,227 | 2/1939 | Olson et al. | 222/189 X |
| 2,507,684 | 5/1950 | Smith | 73/428 X |

FOREIGN PATENTS OR APPLICATIONS 112,982   12/1925   Switzerland .......................... 73/166

*Primary Examiner*—Stanley H. Tollberg
*Assistant Examiner*—Norman L. Stack, Jr.
*Attorney, Agent, or Firm*—Fitzpatrick, Cella, Harper & Scinto

[57] ABSTRACT

A dispensing attachment for use with a bottle including, a dip stick extending from an opening in the top of the bottle to the bottom thereof, which has indicia thereon for indicating the quantity of contents dispensed from the bottle, a stopper member for removably securing the dip stick to the bottle adjacent the opening, and a dispensing member for dispensing the contents from the bottle through the opening; and in one form thereof a frangible sealing member for sealing the stopper member to the bottle so that it is readily observable when the stopper member has been removed therefrom.

4 Claims, 8 Drawing Figures

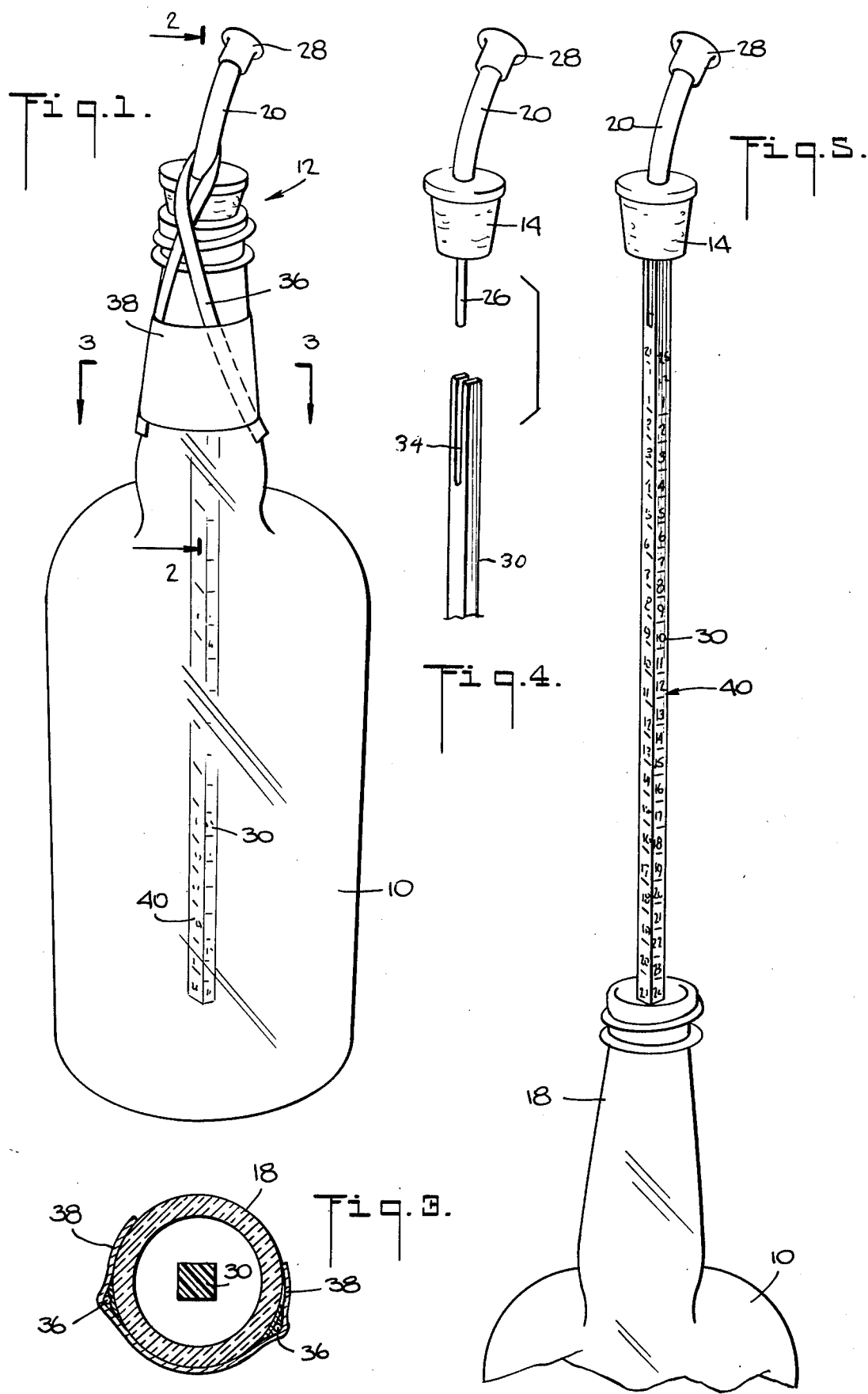

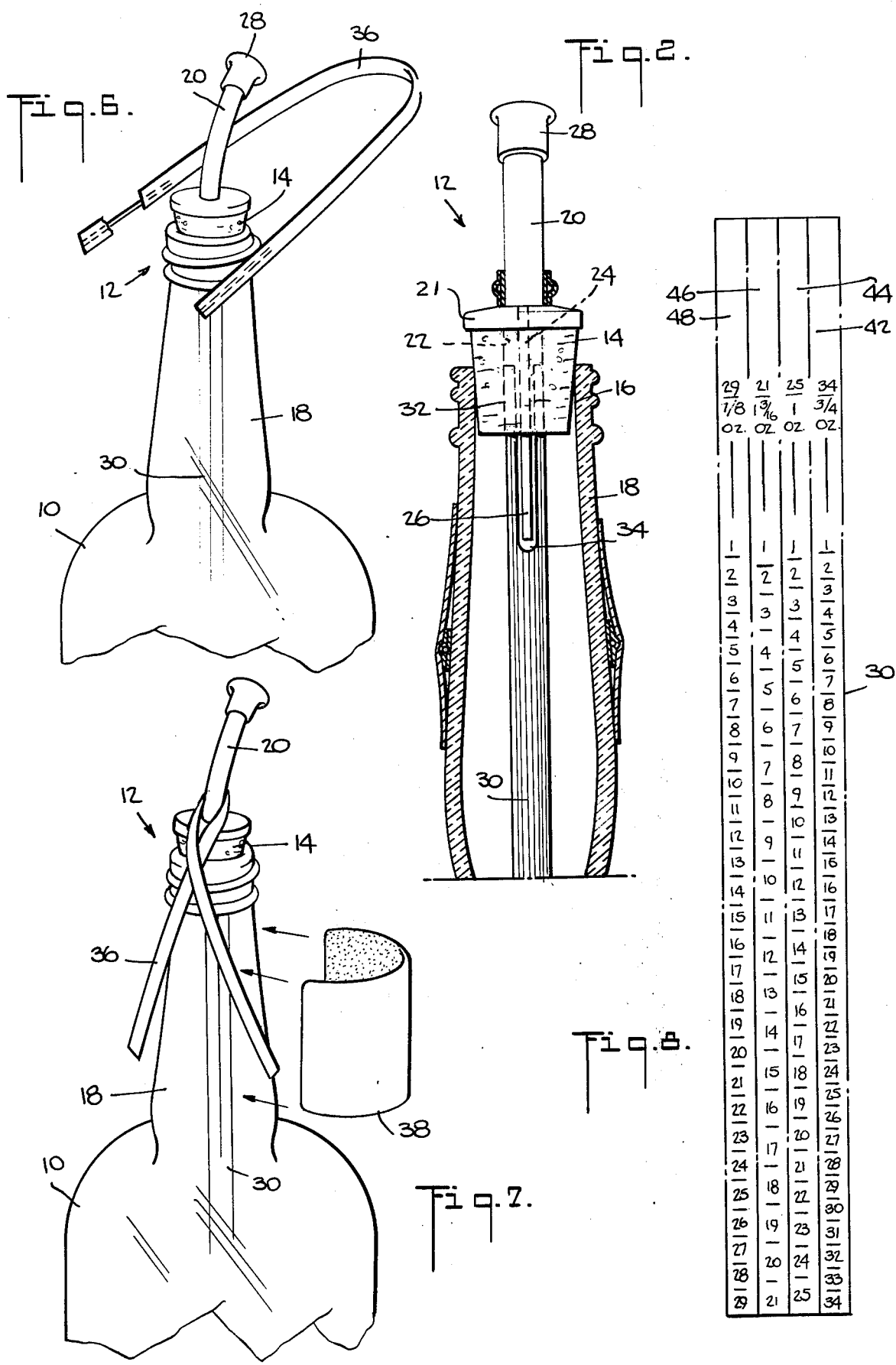

DISPENSING ATTACHMENT FOR INDICATING AMOUNT OF FLUID CONTENT REMOVED FROM A CONTAINER THEREFOR

This invention relates to a dispenser attachment to be used for the selling of liquor from open bottles directly to the consumer and for indicating individual drinks poured from the bottle to provide positive pinpoint control of the contents of each individual bottle by itself.

Numerous devices of this general character have been devised in the past. However, most of these prior known devices are quite complex and involve intricate mechanisms for accomplishing the ultimate result. While many of these devices have been used heretofore with reasonable success, my contribution to the art is a new device, which is an improvement over such prior art devices, as will become apparent as the description proceeds.

In order to accomplish the desired results, I provide a new and improved dispenser attachment characterized by a dip stick extending from an opening in the top of the bottle to the bottom thereof. This dip stick has indicia thereon for indicating the quantity of contents dispensed from the bottle. Stopper means are provided for removably securing the dip stick to the bottle adjacent the opening and means are also provided for dispensing the contents from the bottle through the opening.

In one form of the invention, the stopper member has an axial passage extending therethrough and a pouring spout is provided in fluid flow communication with the passage. According to an aspect of the invention, frangible sealing means are employed for sealing the stopper member to the bottle, whereby it is readily observable when the stopper member has been removed therefrom. According to a further aspect of the invention, I provide a vent tube mounted in the pouring spout which extends down into the bottle. The dip stick is provided with a slot at the upper end thereof for receiving said vent tube. Preferably, the dip stick has a plurality of surfaces, each of which have indicia thereon that indicate the number of drinks of a predetermined size which have been dispensed from the bottle.

According to a further feature of the invention, the frangible sealing means comprising a flexible tape which is looped around the pouring spout adjacent the stopper member and a sealing label is passed over the free ends of the tag and adhered to the bottle. Thus, if the flexible tape and/or the sealing label is broken, it is readily apparent that the dispensing attachment has been tampered with.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

One embodiment of the invention has been chosen for purposes of illustration and description, and is shown in the accompanying drawings forming a part of the specification wherein:

FIG. 1 is a perspective view of a dispenser attachment mounted on a bottle, according to the concept of my invention;

FIG. 2 is an elarged sectional view taken along the line indicated at 2—2 in FIG. 1;

FIG. 3 is an enlarged sectional view taken along the line indicated at 3—3 in FIG. 1;

FIG. 4 is an exploded fragmentary view of a portion of the dispenser attachment;

FIG. 5 is a perspective view of the dispenser and the upper portion of the bottle;

FIG. 6 is an enlarged perspective view showing the means for mounting the dispenser on the top of the bottle;

FIG. 7 is an enlarged perspective view similar to FIG. 6, but showing additional details of the means for mounting the dispenser attachment on the top of the bottle; and FIG. 8 is an enlarged layout showing indicia means for indicating the number of individual drinks dispensed from the bottle, in accordance with the concept of my invention. In the illustrated embodiment of my invention, as seen in FIG. 1, there is shown a bottle 10 having secured to the open top thereof a dispensing attachment, indicated generally at 12. The dispensing attachment, as best seen in FIG. 2, comprises a stopper member or cork 14 removably mounted in the opening 16 in the neck 18 of the bottle 10.

A pouring spout 20 is secured to the cork 14, as by means of a flange portion 21, provided for the purpose. The pouring spout is in fluid flow communication with an axially directed, medial passage 22 extending through the cork so that the contents of the bottle may be dispensed therethrough. A vent tube 24 is mounted in the pouring spot 20, which extends from the top of the spout down through the cork and into the upper portion of the bottle, as indicated at 26, FIG. 2. A cap 28 is removably secured to the upper end of the pouring spout 20.

The dispenser attachment further includes a dip stick 30 having its upper end secured in the passage 22 of the cork 14, as indicated at 32 in FIG. 2. As best seen in FIG. 4, the upper end of the dip stick 30 is provided with a slot 34 for receiving the lower end 26 of the vent tube 24 and for providing a passage through which the contents of the bottle may be passed when being dispensed.

In order to secure the dispenser attachment to the top of the bottle in a tamper-proof manner, the cork 14 is tightly fitted in the opening 16 in the top of the bottle, as best seen in FIGS. 2 and 6, and thence a flexible tape 36 is looped around the pouring spout 20 adjacent the top of the cork, as shown in FIG. 7. A frangible sealing label 38 is then secured over the free ends of the tape 36 and adhered to the neck 18 of the bottle, as seen in FIGS. 3 and 7. Any suitable adhering means may be employed for securing the sealing label to the bottle such as a pre-applied adhesive on the back of the label, for example. It will thus be appreciated that once the sealing label 38 secures the flexible tape 36 to the bottle, the dispensing attachment cannot be removed from the bottle without destroying the tape and/or label and thereby indicating that the device has been tampered with.

In order to provide a continuous indication of the number of drinks dispensed from the bottle, the dip stick 30 is provided with indicia, indicated generally at 40, on the surface thereof, as best seen in FIGS. 1, 5 and 8. Preferably, the dip stick is provided with a plurality of flat surface areas, such as indicated at 40 in FIG. 5, for example. On each surface there is provided a series of numbers which indicate the number of drinks dispensed of a predetermined size. That is, for example, surface 42, FIG. 8, indicates that the bottle contains a total of 34 drinks with each drink containing three-fourths of an ounce; surface 44 indicates that the bottle contains a total of 25 1-ounce drinks; surface 46 indicates that the bottle contains 21 1 and 3/16 ounce drinks; and surface 48 indicates that the bottle contains 29 7/8 ounce drinks. Each surface has a series of consecutive numbers which are spaced a predetermined distance apart so that when an observer looks through the bottle from the outside, when it is held in an upright position, he can observe the surface line of the contents of the bottle and read the number of drinks of that particular size that have been dispensed from the bottle.

When the bottle is completely empty, the steward receives it, breaks the flexible tape 36 and removes the dispenser attachment so that it can be placed on a new bottle and the foregoing procedure is repeated.

It will thus be seen that the present invention does indeed provide a new and improved dispenser attachement which is superior in simplicity, operability, reliability, economy and efficiency as compared to prior art such devices. Although a certain particular embodiment of the invention is herein disclosed for purposes of explanation, various modifications thereof, after study of this specification, will be apparent to those skilled in the art to which the invention pertains.

What is claimed and desired to be secured by Letters Patent is:

1. A dispenser attachment for use with a bottle comprising, in combination, a cork-like member removably mountable in an opening in the bottle, said cork-like member having a medial passage extending axially therethrough, a pouring spout secured to the cork-like member in fluid flow communication with said passage so that the contents of the bottle may be dispensed therethrough, a vent tube mounted in the pouring spout extending from the upper end of the pouring spout down into the upper portion of said bottle, a dip stick having its upper end mounted in the passage of said cork-like member and its lower end extending adjacent the bottom of the bottle, said dip stick having its upper end slotted for receiving said vent tube, said dip stick having a plurality of surfaces and each surface having a series of numerals thereon spaced a predetermined distance apart for indicating the number of drinks of a predetermined size dispensed from said bottle, a flexible tape looped around the pouring spout adjacent the top of the cork-like member, a frangible sealing label secured to the free ends of said tape and adhered to the bottle, whereby it is readily observable when said cork-like member has been tampered with.

2. A dispensing attachment for use with a bottle comprising, in combination, a dip stick extending from an opening in the top of the bottle to the bottom thereof and having a slot in the upper end thereof, said dip stick having indicia thereon for indicating the quantity of contents dispensed from said bottle, means comprising a stopper member having an axial passage therethrough for removably securing said dip stick to said bottle adjacent said opening, means for dispensing the contents from said bottle through said opening, said last mentioned means comprising a pouring spout connected to said stopper member in fluid flow relationship with respect to said passage, and a vent tube mounted in said pouring spout and extending down into the upper portion of said bottle and into said slot in said dip stick, the upper end of said dip stick being attached to said stopper member within said passage.

3. A dispensing attachment according to claim 2, wherein said stopper member is a cork and the upper end of said dip stick is held by expansion qualities of the dip stick slot area when inserted within said passage in said cork.

4. A dispensing attachment for use with a bottle comprising, in combination, a dip stick extending from an opening in the top of the bottle to the bottom thereof, said dip stick having indicia thereon for indicating the quantity of contents dispensed from said bottle, means comprising a stopper member having an axial passage therethrough for removably securing said dip stick to said bottle adjacent said opening, means for dispensing the contents from said bottle through said opening, said last mentioned means comprising a pouring spout connected to said stopper member in fluid flow relationship with respect to said passage, and frangible sealing means for sealing said stopper member to said bottle whereby it is readily observable when said stopper member has been tampered with, said sealing means comprising a flexible tape loopable around the pouring spout adjacent the top of the stopper member and a frangible sealing label for securing the free ends of he tape to the bottle.

* * * * *